US009000096B2

(12) United States Patent
Brodil et al.

(10) Patent No.: US 9,000,096 B2
(45) Date of Patent: Apr. 7, 2015

(54) POLYETHYLENE BLEND COMPOSITION HAVING A REDUCED CHILL ROLL BUILDUP DURING EXTRUSION PROCESS

(75) Inventors: Jason C. Brodil, Rosharon, TX (US); James L. Cooper, Brazoria, TX (US); Nathan J. Wiker, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/115,948

(22) PCT Filed: May 27, 2011

(86) PCT No.: PCT/US2011/038347
§ 371 (c)(1),
(2), (4) Date: Feb. 26, 2014

(87) PCT Pub. No.: WO2012/166093
PCT Pub. Date: Dec. 6, 2012

(65) Prior Publication Data
US 2014/0221558 A1    Aug. 7, 2014

(51) Int. Cl.
| | |
|---|---|
| C08L 23/06 | (2006.01) |
| C08L 23/08 | (2006.01) |
| B32B 27/32 | (2006.01) |
| C08L 23/04 | (2006.01) |
| C08J 5/18 | (2006.01) |
| C08F 2/34 | (2006.01) |
| C08F 4/6192 | (2006.01) |

(52) U.S. Cl.
CPC ............ C08L 23/0815 (2013.01); C08L 23/04 (2013.01); C08L 23/06 (2013.01); C08J 5/18 (2013.01); C08L 2205/02 (2013.01); C08L 2314/06 (2013.01); C08J 2323/08 (2013.01); C08J 2423/06 (2013.01); C08L 2203/16 (2013.01); C08L 2207/066 (2013.01)

(58) Field of Classification Search
USPC .................................. 525/191, 240; 428/523
See application file for complete search history.

(56) References Cited

U.S. PATENT DOCUMENTS

| | | | |
|---|---|---|---|
| 4,543,399 A | | 9/1985 | Jenkins, III et al. |
| 4,621,952 A | | 11/1986 | Aronson |
| 4,790,676 A | * | 12/1988 | Karatsu et al. ............ 400/241.1 |
| 4,933,149 A | | 6/1990 | Rhee et al. |
| 5,405,922 A | | 4/1995 | DeChellis et al. |
| 5,462,999 A | | 10/1995 | Griffin et al. |
| 6,242,545 B1 | | 6/2001 | Jejelowo et al. |
| 6,485,662 B1 | | 11/2002 | Neubauer et al. |
| 6,627,713 B2 | | 9/2003 | Bernier et al. |
| 7,078,467 B1 | | 7/2006 | Kolb et al. |
| 2007/0260016 A1 | * | 11/2007 | Best et al. ...................... 525/240 |
| 2008/0221273 A1 | * | 9/2008 | Michie, Jr. et al. ........... 525/240 |
| 2010/0298508 A1 | * | 11/2010 | Michie et al. ................... 526/90 |

FOREIGN PATENT DOCUMENTS

| | | |
|---|---|---|
| EP | 0255144 B1 | 2/1988 |
| JP | 08-269270 | 10/1996 |
| WO | WO2005/002744 | 1/2005 |
| WO | WO2006/138007 | 12/2006 |
| WO | 2007130277 A1 | 11/2007 |
| WO | 2009097222 A1 | 8/2009 |
| WO | 2010/006097 A1 | 1/2010 |
| WO | WO 2011/025742 A1 * | 3/2011 |

OTHER PUBLICATIONS

PCT/US2011/038347, International Search Report dated Sep. 12, 2011.
PCT/US2011/038347, International Preliminary Report on Patentability dated Dec. 2, 2013.
PCT/US2011/038347, Written Opinion of the International Searching Authority dated Sep. 12, 2011.
Japanese Office Action Jan. 21, 2015; from JP counterpart Application No. 2014-512809.

* cited by examiner

*Primary Examiner* — Fred M Teskin

(57) ABSTRACT

The instant invention provides a polyethylene blend composition having reduced chill roll buildup during extrusion process, and films and coating layers made therefrom. The polyethylene blend composition according to the present invention provide reduced chill roll buildups during extrusion process, and comprises: (a) from 60 to 95 percent by weight of a linear polyethylene composition comprising less than or equal to 100 percent by weight of the units derived from ethylene, and less than 15 percent by weight of units derived from one or more α-olefin comonomers; wherein said linear polyethylene composition has a density in the range of from 0.917 to 0.975 g/cm$^3$, a molecular weight distribution ($M_w/M_n$) in the range of from 1.70 to 3.62, a melt index (I2) in the range of from 2 to 50 g/10 minutes, and a vinyl unsaturation in the range of from less than 0.06 vinyls per one thousand carbon atoms present in the linear polyethylene composition; and (b) from 5 to 40 percent by weight of a low density polyethylene composition (LDPE) having a density in the range of from 0.915 to 0.930 g/cm$^3$, and a melt index ($I_2$) in the range of from 0.4 to 10; wherein the polyethylene blend composition has a density in the range of 0.917 to 0.960 g/cm$^3$ and a melt index ($I_2$) in the range of from 2 to 30 g/10 minutes.

9 Claims, 3 Drawing Sheets

POLYETHYLENE BLEND COMPOSITION HAVING A REDUCED CHILL ROLL BUILDUP DURING EXTRUSION PROCESS

FIELD OF INVENTION

The instant invention relates to a polyethylene blend composition having a reduced chill roll buildup during extrusion process, and films and/or coating layers made therefrom.

BACKGROUND OF THE INVENTION

The use of polyethylene compositions, such as linear low density polyethylenes and/or high density polyethylenes, in fabrication of films and/or coating layers is generally known. Any conventional method, such as gas phase process, slurry process, or solution process, may be employed to produce such polyethylene compositions. In addition, any conventional method, such as cast film extrusion process, extrusion coating process, and/or extrusion lamination process may be employed to produce such films and/or coating layers.

However, currently available polyethylene compositions generate certain levels of chill roll buildups during the extrusion process. Such chill roll buildups typically create various undesirable processability issues.

Therefore, there is a need for a polyethylene blend composition having reduced level of chill roll buildups during the extrusion process, for example extrusion coating process, extrusion lamination process, and/or cast film extrusion process.

Various polymerization techniques using different catalyst systems have been employed to produce such polyethylene compositions suitable for extrusion coating, extrusion lamination, and/or cast film production applications. However, the currently available polyethylene compositions hinder such processes, e.g. accumulation of contaminants on process equipments such as the chill roll; thus, requiring equipment clean up.

Despite the research efforts in developing polyethylene compositions suitable for extrusion coating, extrusion lamination, and/or cast film production applications, there is still a need for a polyethylene blend composition having improved processability, e.g. reduced accumulation of contaminants on equipment parts such as the chill roll.

SUMMARY OF THE INVENTION

The instant invention provides a polyethylene blend composition having a reduced chill roll buildup during extrusion process, and films and/or coating layers made therefrom.

In the one embodiment, the present invention provides a polyethylene blend composition having a reduced chill roll buildup during extrusion process comprising: (a) from 60 to 95 percent by weight of a linear polyethylene composition comprising less than or equal to 100 percent by weight of the units derived from ethylene, and less than 15 percent by weight of units derived from one or more α-olefin comonomers; wherein said linear polyethylene composition has a density in the range of from 0.917 to 0.975 g/cm$^3$, a molecular weight distribution ($M_w/M_n$) in the range of from 1.70 to 3.62, a melt index ($I_2$) in the range of from 2 to 50 g/10 minutes, a vinyl unsaturation in the range of from less than 0.06 vinyls per one thousand carbon atoms present in the linear polyethylene composition; (b) from 5 to 40 percent by weight of a low density polyethylene composition (LDPE) having a density in the range of from 0.915 to 0.930 g/cm$^3$, and a melt index ($I_2$) in the range of from 0.4 to 10; wherein the polyethylene blend composition has a density in the range of 0.917 to 0.960 g/cm$^3$ and a melt index ($I_2$) in the range of from 2 to 30 g/10 minutes.

In an alternative embodiment, the instant invention provides an article comprising (a) one or more substrates; and (b) one or more coating layers or laminated layers associated with one or more surfaces of said one or more substrates, wherein said one or more coating layers or laminate layers comprise the polyethylene blend composition, as described above.

In an alternative embodiment, the instant invention provides a film comprising the polyethylene blend composition, as described above.

In an alternative embodiment, the instant invention provides an article comprising (a) one or more substrates; and (b) one or more coating layers or laminated layers associated with one or more surfaces of said one or more substrates, wherein said one or more coating layers or laminate layers comprise the polyethylene blend composition, as described above.

In another alternative embodiment, the instant invention provides a polyethylene blend composition, a film and an article made therefrom, in accordance with any of the preceding embodiments, except that the linear polyethylene composition is a linear low density polyethylene (LLDPE), a high density polyethylene (HDPE), or combinations thereof.

In another alternative embodiment, the instant invention provides a polyethylene blend composition, a film and an article made therefrom, in accordance with any of the preceding embodiments, except that the linear polyethylene composition has a density in the range of from 0.940 to 0.960 g/cm$^3$ and/or a melt index ($I_2$) in the range of from 15 to 40 g/10 minutes.

In another alternative embodiment, the instant invention provides a polyethylene blend composition, a film and an article made therefrom, in accordance with any of the preceding embodiments, except that the LDPE has a density in the range of from 0.917 to 0.930 g/cm$^3$ and/or a melt index ($I_2$) in the range of from 0.4 to 5 g/10 minutes.

In another alternative embodiment, the instant invention provides a polyethylene blend composition, a film and an article made therefrom, in accordance with any of the preceding embodiments, except that the linear polyethylene composition has less than 2 peaks on an elution temperature-eluted amount curve determined by Crystallization Elution Fractionation (CEF) method at equal or above 30° C., wherein the purge peak which is below 30° C. is excluded.

In another alternative embodiment, the instant invention provides a polyethylene blend composition, a film and an article made therefrom, in accordance with any of the preceding embodiments, except that the linear polyethylene composition is substantially free of long chain branching.

In another alternative embodiment, the instant invention provides a polyethylene blend composition, a film and an article made therefrom, in accordance with any of the preceding embodiments, except that the linear polyethylene composition comprises less than 100 parts by weight of a hafnium based metallocene catalyst per one million parts of polyethylene composition.

In another alternative embodiment, the instant invention provides a polyethylene blend composition, a film and an article made therefrom, in accordance with any of the preceding embodiments, except that the linear polyethylene composition is the (co)polymerization reaction product of ethylene and optionally one or more α-olefin comonomers in the presence of a hafnium based metallocene catalyst via a gas phase (co)polymerization process in a single stage reactor.

In another alternative embodiment, the instant invention provides an article, in accordance with any of the preceding embodiments, except that the article is obtained via extrusion coating process or extrusion lamination process.

In another alternative embodiment, the instant invention provides a film, in accordance with any of the preceding embodiments, except that the film is obtained via cast film extrusion process.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
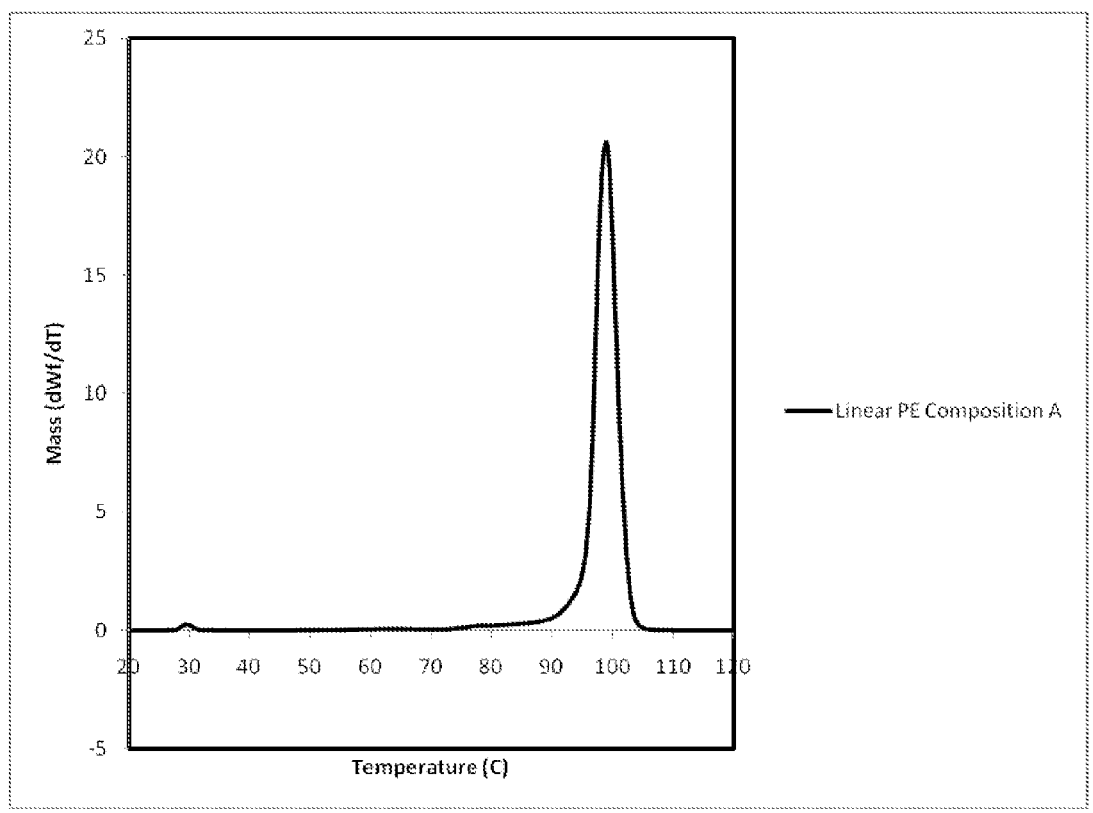
FIG. 1 is a graph illustrating the relationship between Mass (dWf/dt) and Temperature (° C.) of the linear polyethylene composition A, as determined by CEF.

The instant invention provides a polyethylene blend composition having a reduced chill roll buildup during extrusion process, and films and/or coating layers made therefrom.

In the one embodiment, the present invention provides a polyethylene blend composition having a reduced chill roll buildup during extrusion process comprising: (a) from 60 to 95 percent by weight of a linear polyethylene composition, as described in further details hereinbelow, comprising less than or equal to 100 percent by weight of the units derived from ethylene, and less than 15 percent by weight of units derived from one or more α-olefin comonomers; wherein said linear polyethylene composition has a density in the range of from 0.917 to 0.975 g/cm$^3$, a molecular weight distribution ($M_w/M_n$) in the range of from 1.70 to 3.62, a melt index ($I_2$) in the range of from 2 to 50 g/10 minutes, a vinyl unsaturation in the range of from less than 0.06 vinyls per one thousand carbon atoms present in the linear polyethylene composition; (b) from 5 to 40 percent by weight of a low density polyethylene composition (LDPE), as described in further details herein below, having a density in the range of from 0.915 to 0.930 g/cm$^3$, and a melt index ($I_2$) in the range of from 0.4 to 10; wherein the polyethylene blend composition has a density in the range of 0.917 to 0.960 g/cm$^3$ and a melt index ($I_2$) in the range of from 2 to 30 g/10 minutes.

Linear Polyethylene Composition Component

The linear polyethylene composition, as used herein, includes linear low density polyethylene compositions as well as high density polyethylene compositions. Such linear polyethylene compositions are substantially free of any long chain branching, and preferably, the linear polyethylene composition is free of any long chain branching. Substantially free of any long chain branching, as used herein, refers to a linear polyethylene composition preferably substituted with less than about 0.1 long chain branching per 1000 total carbons, and more preferably, less than about 0.01 long chain branching per 1000 total carbons.

The term (co)polymerization, as used herein, refers to the polymerization of ethylene and optionally one or more comonomers, e.g. one or more α-olefin comonomers. Thus, the term (co)polymerization refers to both polymerization of ethylene and copolymerization of ethylene and one or more comonomers, e.g. one or more α-olefin comonomers.

The polyethylene blend composition comprises from 60 to 95 percent by weight of the linear polyethylene composition, based on the total weight of the polyethylene blend composition; for example, from 70 to 95 by weight percent; or in the alternative, from 80 to 95 weight percent.

The linear polyethylene composition according to instant invention has a density in the range of from 0.917 to 0.975, for example, from 0.917 to 0.960; or in the alternative, from 0.940 to 0.960; or in the alternative, from 0.950 to 0.960; or in the alternative, from 0.917 to 0.940. All individual values and subranges from 0.917 to 0.975 g/cm$^3$ are included herein and disclosed herein; for example, the density can be from a lower limit of 0.917, 0.919, 0.923, 0.928, or 0.936 g/cm$^3$ to an upper limit of 0.940, 0.943, 0.947, 0.954, 0.959, 0.965, 0.972, or 0.975 g/cm$^3$.

The linear polyethylene composition according to the instant invention has a molecular weight distribution ($M_w/M_n$) (measured according to the conventional GPC method) in the range of 1.70 to 3.62. All individual values and subranges from 1.70 to 3.62 are included herein and disclosed herein; for example, the molecular weight distribution ($M_w/M_n$) can be from a lower limit of 1.70, 1.80, 1.90, 2.10, 2.30, 2.50, 2.70, 2.90, 3.10, 3.30, or 3.50 to an upper limit of 2.95, 3.15, 3.35, 3.55, 3.60, or 3.62. For example, the linear polyethylene composition may have a molecular weight distribution ($M_w/M_n$) in the range of 1.70 to 3.60; or in the alternative, the linear polyethylene composition may have a molecular weight distribution ($M_w/M_n$) in the range of 1.70 to 3.55; or in the alternative, the linear polyethylene composition may have a molecular weight distribution ($M_w/M_n$) in the range of 1.70 to 3.35; or in the alternative, the linear polyethylene composition may have a molecular weight distribution ($M_w/M_n$) in the range of 1.70 to 3.15; or in the alternative, the linear polyethylene composition may have a molecular weight distribution ($M_w/M_n$) in the range of 1.70 to 2.95; or in the alternative, the linear polyethylene composition may have a molecular weight distribution ($M_w/M_n$) in the range of 1.70 to 2.75; or in the alternative, the linear polyethylene composition may have a molecular weight distribution ($M_w/M_n$) in the range of 1.70 to 2.55; or in the alternative, the linear polyethylene composition may have a molecular weight distribution ($M_w/M_n$) in the range of 1.70 to 2.35; or in the alternative, the linear polyethylene composition may have a molecular weight distribution ($M_w/M_n$) in the range of 1.70 to 2.15; or in the alternative, the linear polyethylene composition may have a molecular weight distribution ($M_w/M_n$) in the range of 1.70 to 1.95; or in the alternative, the linear polyethylene composition may have a molecular weight distribution ($M_w/M_n$) in the range of 1.70 to 1.85.

The linear polyethylene composition according to the instant invention has a melt index ($I_2$) in the range of from 2 to 50 g/10 minutes; for example from 2 to 30 g/10 minutes; or in the alternative from 2 to 40 g/10 minutes. All individual values and subranges from 2 to 50 g/10 minutes are included herein and disclosed herein; for example, the melt index ($I_2$) can be from a lower limit of 2, 3, 5, 10, 20, 30, or 40 g/10 minutes, to an upper limit of 10, 20, 30, 40, or 50 g/10 minutes.

The linear polyethylene composition according to the instant invention has a weight average molecular weight ($M_w$) in the range of 15,000 to 100,000 daltons. All individual values and subranges from 15,000 to 100,000 daltons are included herein and disclosed herein; for example, the weight average molecular weight ($M_w$) can be from a lower limit of 15,000, 20,000, 25,000, 30,000, 34,000, 40,000, 50,000, 60,000, 70,000, 80,000, 90,000, or 95,000 daltons to an upper limit of 20,000, 25,000, 30,000, 33,000, 40,000, 50,000, 60,000, 70,000, 80,000, 90,000, 95,000, 100,000.

The linear polyethylene composition may have molecular weight distribution ($M_z/M_w$) (measured according to the conventional GPC method) in the range of less than 5. All individual values and subranges from less than 5 are included herein and disclosed herein; for example, the linear polyethylene composition may have a molecular weight distribution ($M_z/M_w$) in the range of less than 4.5; or in the alternative, the linear polyethylene composition may have a molecular weight distribution ($M_z/M_w$) in the range of less than 4; or in the alternative, the linear polyethylene composition may have a molecular weight distribution ($M_z/M_w$) in the range of less than 3.5; or in the alternative, the linear polyethylene composition may have a molecular weight distribution ($M_z/M_w$) in the range of less than 3.0; or in the alternative, the linear polyethylene composition may have a molecular weight distribution ($M_z/M_w$) in the range of less than 2.8; or in the alternative, the linear polyethylene composition may have a molecular weight distribution ($M_z/M_w$) in the range of less than 2.6; or in the alternative, the linear polyethylene composition may have a molecular weight distribution ($M_z/M_w$) in the range of less than 2.5; or in the alternative, the linear polyethylene composition may have a molecular weight distribution ($M_z/M_w$) in the range of less than 2.4; or in the alternative, the linear polyethylene composition may have a molecular weight distribution ($M_z/M_w$) in the range of less than 2.3; or in the alternative, the linear polyethylene composition may have a molecular weight distribution ($M_z/M_w$) in the range of less than 2.2.

The linear polyethylene composition may have a vinyl unsaturation of less than 0.1 vinyls per one thousand carbon atoms present in the linear polyethylene composition. All individual values and subranges from less than 0.1 are included herein and disclosed herein; for example, the linear polyethylene composition may have a vinyl unsaturation of less than 0.08 vinyls per one thousand carbon atoms present in the linear polyethylene composition; or in the alternative, the linear polyethylene composition may have a vinyl unsaturation of less than 0.06 vinyls per one thousand carbon atoms present in the linear polyethylene composition; or in the alternative, the linear polyethylene composition may have a vinyl unsaturation of less than 0.04 vinyls per one thousand carbon atoms present in the linear polyethylene composition; or in the alternative, the linear polyethylene composition may have a vinyl unsaturation of less than 0.02 vinyls per one thousand carbon atoms present in the linear polyethylene composition; or in the alternative, the linear polyethylene composition may have a vinyl unsaturation of less than 0.01 vinyls per one thousand carbon atoms present in the linear polyethylene composition.

The linear polyethylene composition may comprise less than 15 percent by weight of units derived from one or more α-olefin comonomers. All individual values and subranges from less than 15 weight percent are included herein and disclosed herein; for example, the linear polyethylene composition may comprise less than 12 percent by weight of units derived from one or more α-olefin comonomers; or in the alternative, the linear polyethylene composition may comprise less than 10 percent by weight of units derived from one or more α-olefin comonomers; or in the alternative, the linear polyethylene composition may comprise less than 8 percent by weight of units derived from one or more α-olefin comonomers; or in the alternative, the linear polyethylene composition may comprise less than 5 percent by weight of units derived from one or more α-olefin comonomers; or in the alternative, the linear polyethylene composition may comprise less than 3 percent by weight of units derived from one or more α-olefin comonomers; or in the alternative, the linear polyethylene composition may comprise less than 1 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The linear polyethylene composition may comprise at least 85 percent by weight of units derived from ethylene. All individual values and subranges from at least 85 weight percent are included herein and disclosed herein; for example, the linear polyethylene composition may comprise at least 90 percent by weight of units derived from ethylene; or in the alternative, the linear polyethylene composition may comprise at least 95 percent by weight of units derived from ethylene; or in the alternative, the linear polyethylene composition may comprise at least 97 percent by weight of units derived from ethylene; or in the alternative, the linear polyethylene composition may comprise at least 99 percent by weight of units derived from ethylene.

The linear polyethylene composition may further comprise less than or equal to 100 parts by weight of hafnium residues remaining from the hafnium based metallocene catalyst per one million parts of linear polyethylene composition. All individual values and subranges from less than or equal to 100 ppm are included herein and disclosed herein; for example, the linear polyethylene composition may further comprise less than or equal to 10 parts by weight of hafnium residues remaining from the hafnium based metallocene catalyst per one million parts of linear polyethylene composition; or in the alternative, the linear polyethylene composition may further comprise less than or equal to 8 parts by weight of hafnium residues remaining from the hafnium based metallocene catalyst per one million parts of linear polyethylene composition; or in the alternative, the linear polyethylene composition may further comprise less than or equal to 6 parts by weight of hafnium residues remaining from the hafnium based metallocene catalyst per one million parts of linear polyethylene composition; or in the alternative, the linear polyethylene composition may further comprise less than or equal to 4 parts by weight of hafnium residues remaining from the hafnium based metallocene catalyst per one million parts of linear polyethylene composition; or in the alternative, the linear polyethylene composition may further comprise less than or equal to 2 parts by weight of hafnium residues remaining from the hafnium based metallocene catalyst per one million parts of linear polyethylene composition; or in the alternative, the linear polyethylene composition may further comprise less than or equal to 1.5 parts by weight of hafnium residues remaining from the hafnium based metallocene catalyst per one million parts of linear polyethylene composition; or in the alternative, the linear polyethylene composition may further comprise less than or equal to 1 parts by weight of hafnium residues remaining from the hafnium based metallocene catalyst per one million parts of linear polyethylene composition; or in the alternative, the linear polyethylene composition may further comprise less than or equal to 0.75 parts by weight of hafnium residues remaining from the hafnium based metallocene catalyst per one million parts of linear polyethylene composition; or in the alternative, the linear polyethylene composition may further comprise less than or equal to 0.5 parts by weight of hafnium residues remaining from the hafnium based metallocene catalyst per one million parts of linear polyethylene composition the linear polyethylene composition may further comprise less than or equal to 0.25 parts by weight of hafnium residues remaining from the hafnium based metallocene catalyst per one million parts of linear polyethylene composition. The hafnium residues remaining from the hafnium based metallocene catalyst in the linear polyethylene composition may be measured by x-ray fluorescence (XRF), which is calibrated to reference standards. The polymer resin granules were compression molded at elevated temperature into plaques having a thickness of about ⅜ of an inch for the x-ray measurement in a preferred method. At very low concentrations of metal, such as below 0.1 ppm, ICP-AES would be a suitable method to determine metal residues present in the linear polyethylene composition. In one embodiment, the linear polyethylene composition has substantially no chromium, zirconium or titanium content, that is, no or only what would be considered by those skilled in the art, trace amounts of these metals are present, such as, for example, less than 0.001 ppm.

The linear polyethylene composition has less than 2 peaks on an elution temperature-eluted amount curve determined by Crystallization Elution Fractionation (CEF) method at equal or above 30° C., wherein the purge peak which is below 30° C. is excluded. In the alternative, the linear polyethylene composition has only 1 peak or less on an elution temperature-eluted amount curve determined by Crystallization Elution Fractionation (CEF) method at equal or above 30° C., wherein the purge peak which is below 30° C. is excluded. In the alternative, the linear polyethylene composition has only 1 peak on an elution temperature-eluted amount curve determined by Crystallization Elution Fractionation (CEF) method at equal or above 30° C., wherein the purge peak which is below 30° C. is excluded. In addition, artifacts generated due to instrumental noise at either side of a peak are not considered to be peaks.

The linear polyethylene composition may further comprise additional components such as other polymers and/or additives. Such additives include, but are not limited to, antistatic agents, color enhancers, dyes, lubricants, fillers, pigments, primary antioxidants, secondary antioxidants, processing aids, UV stabilizers, nucleators, and combinations thereof. The inventive polyethylene composition may contain any amounts of additives. The linear polyethylene composition may comprise from about 0 to about 10 percent by the combined weight of such additives, based on the weight of the linear polyethylene composition including such additives. All individual values and subranges from about 0 to about 10 weight percent are included herein and disclosed herein; for example, the linear polyethylene composition may comprise from 0 to 7 percent by the combined weight of additives, based on the weight of the linear polyethylene composition including such additives; in the alternative, the linear polyethylene composition may comprise from 0 to 5 percent by the combined weight of additives, based on the weight of the linear polyethylene composition including such additives; or in the alternative, the linear polyethylene composition may comprise from 0 to 3 percent by the combined weight of additives, based on the weight of the linear polyethylene composition including such additives; or in the alternative, the linear polyethylene composition may comprise from 0 to 2 percent by the combined weight of additives, based on the weight of the linear polyethylene composition including such additives; or in the alternative, the linear polyethylene composition may comprise from 0 to 1 percent by the combined weight of additives, based on the weight of the linear polyethylene composition including such additives; or in the alternative, the linear polyethylene composition may comprise from 0 to 0.5 percent by the combined weight of additives, based on the weight of the linear polyethylene composition including such additives.

In one embodiment, the linear polyethylene composition is free of any catalyst kill agents such as calcium stearate, zinc stearate, zinc oxide, and/or the like. The presence of such catalyst kill agents can plate out on rollers in the cast film process, extrusion coating process, blown film process or other polymer fabrication processes.

Any conventional ethylene (co)polymerization reaction may be employed to produce such linear polyethylene compositions. Such conventional ethylene (co)polymerization reactions include, but are not limited to, gas phase polymerization process, slurry phase polymerization process, liquid phase polymerization process, and combinations thereof using one or more conventional reactors, e.g. fluidized bed gas phase reactors, loop reactors, stirred tank reactors, batch reactors in parallel, series, and/or any combinations thereof. In the alternative, such linear polyethylene compositions may be produced in a high pressure reactor via a coordination catalyst system. For example, the linear polyethylene composition may be produced via gas phase polymerization process in a single gas phase reactor; however, the production of such linear polyethylene compositions is not so limited to gas phase polymerization process, and any of the above polymerization processes may be employed. In one embodiment, the polymerization reactor may comprise of two or more reactors in series, parallel, or combinations thereof. Preferably, the polymerization reactor is one reactor, e.g. a fluidized bed gas phase reactor. In another embodiment, the gas phase polymerization reactor is a continuous polymerization reactor comprising one or more feed streams. In the polymerization reactor, the one or more feed streams are combined together, and the gas comprising ethylene and optionally one or more comonomers, e.g. one or more α-olefins, are flowed or cycled continuously through the polymerization reactor by any suitable means. The gas comprising ethylene and optionally one or more comonomers, e.g. one or more α-olefins, may be fed up through a distributor plate to fluidize the bed in a continuous fluidization process.

In production, a hafnium based metallocene catalyst system including a cocatalyst, as described hereinbelow in further details, ethylene, optionally one or more alpha-olefin comonomers, hydrogen, optionally one or more inert gases and/or liquids, e.g. $N_2$, isopentane, and hexane, and optionally one or more continuity additive, e.g. ethoxylated stearyl amine or aluminum distearate or combinations thereof, are continuously fed into a reactor, e.g. a fluidized bed gas phase reactor. The reactor may be in fluid communication with one or more discharge tanks, surge tanks, purge tanks, and/or recycle compressors. The temperature in the reactor is typically in the range of 70 to 115° C., preferably 75 to 110° C., more preferably 75 to 100° C., and the pressure is in the range of 15 to 30 atm, preferably 17 to 26 atm. A distributor plate at the bottom of the polymer bed provides a uniform flow of the upflowing monomer, comonomer, and inert gases stream. A mechanical agitator may also be provided to provide contact between the solid particles and the comonomer gas stream. The fluidized bed, a vertical cylindrical reactor, may have a bulb shape at the top to facilitate the reduction of gas velocity; thus, permitting the granular polymer to separate from the upflowing gases. The unreacted gases are then cooled to remove the heat of polymerization, recompressed, and then recycled to the bottom of the reactor. Once the residual hydrocarbons are removed, and the resin is transported under $N_2$ to a purge bin, moisture may be introduced to reduce the presence of any residual catalyzed reactions with $O_2$ before the linear polyethylene composition is exposed to oxygen. The linear polyethylene composition may then be transferred to an extruder to be pelletized. Such pelletization techniques are generally known. The linear polyethylene composition may further be melt screened. Subsequent to the melting process in the extruder, the molten composition is passed through one or more active screens, positioned in series of more than one, with each active screen having a micron retention size of from about 2 μm to about 400 μm (2 to $4 \times 10^{-5}$ m), and preferably about 2 μm to about 300 μm (2 to $3 \times 10^{-5}$ m), and most preferably about 2 μm to about 70 μm (2 to $7 \times 10^{-6}$ m), at a mass flux of about 5 to about 100 lb/hr/in$^2$ (1.0 to about 20 kg/s/m$^2$). Such further melt screening is disclosed in U.S. Pat. No. 6,485,662, which is incorporated herein by reference to the extent that it discloses melt screening.

In an embodiment of a fluidized bed reactor, a monomer stream is passed to a polymerization section. The fluidized bed reactor may include a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and optionally one or more α-olefin comonomers, and may also include condensing agents as is known in the art and disclosed in, for example, U.S. Pat. No. 4,543,399, U.S. Pat. No. 5,405,922, and U.S. Pat. No. 5,462,999.

The fluidized bed has the general appearance of a dense mass of individually moving particles, preferably polyethylene particles, as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 1.5 msec and usually no more than 0.76 ft/sec is sufficient.

In general, the height to diameter ratio of the reaction zone can vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. The gas exiting the overhead of the reactor is the recycle gas stream.

The recycle stream is compressed in a compressor and then passed through a heat exchange zone where heat is removed before the stream is returned to the bed. The heat exchange zone is typically a heat exchanger, which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes that contain liquid in the cycle gas stream and those that do not and vice versa. Such deflectors are described in the U.S. Pat. No. 4,933,149 and U.S. Pat. No. 6,627,713.

The hafnium based catalyst system used in the fluidized bed is preferably stored for service in a reservoir under a blanket of a gas, which is inert to the stored material, such as nitrogen or argon. The hafnium based catalyst system may be added to the reaction system, or reactor, at any point and by any suitable means, and is preferably added to the reaction system either directly into the fluidized bed or downstream of the last heat exchanger, i.e. the exchanger farthest downstream relative to the flow, in the recycle line, in which case the activator is fed into the bed or recycle line from a dispenser. The hafnium based catalyst system is injected into the bed at a point above distributor plate. Preferably, the hafnium based catalyst system is injected at a point in the bed where good mixing with polymer particles occurs. Injecting the hafnium based catalyst system at a point above the distribution plate facilitates the operation of a fluidized bed polymerization reactor.

The monomers can be introduced into the polymerization zone in various ways including, but not limited to, direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle stream, and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer is typically positioned to receive gas from a sampling point located between the velocity reduction zone and heat exchanger.

The production rate of linear polyethylene composition may be conveniently controlled by adjusting the rate of catalyst composition injection, activator injection, or both. Since any change in the rate of catalyst composition injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor, i.e. the difference between inlet fluid temperature and exit fluid temperature, is indicative of the rate of linear polyethylene composition formation at a constant fluid velocity if no or negligible vaporizable liquid is present in the inlet fluid.

On discharge of particulate polymer product from reactor, it is desirable and preferable to separate fluid from the product and to return the fluid to the recycle line. There are numerous ways known to the art to accomplish this separation. Product discharge systems which may be alternatively employed are disclosed and claimed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In the fluidized bed gas phase reactor embodiment, the reactor temperature of the fluidized bed process herein ranges from 70° C., or 75° C., or 80° C. to 90° C., or 95° C., or 100° C., or 110° C., or 115° C., wherein a desirable temperature range comprises any upper temperature limit combined with any lower temperature limit described herein. In general, the reactor temperature is operated at the highest temperature that is feasible, taking into account the sintering temperature of the inventive polyethylene composition within the reactor and fouling that may occur in the reactor or recycle line(s).

The above process is suitable for the production of homopolymers comprising ethylene derived units, or copolymers comprising ethylene derived units and at least one or more other α-olefin(s) derived units.

In order to maintain an adequate catalyst productivity in the present invention, it is preferable that the ethylene is present in the reactor at a partial pressure at or greater than 160 psia (1100 kPa), or 190 psia (1300 kPa), or 200 psia (1380 kPa), or 210 psia (1450 kPa), or 220 psia (1515 kPa).

The comonomer, e.g. one or more α-olefin comonomers, if present in the polymerization reactor, is present at any level that will achieve the desired weight percent incorporation of the comonomer into the finished polyethylene. This is expressed as a mole ratio of comonomer to ethylene as described herein, which is the ratio of the gas concentration of comonomer moles in the cycle gas to the gas concentration of ethylene moles in the cycle gas. In one embodiment of the inventive polyethylene composition production, the comonomer is present with ethylene in the cycle gas in a mole ratio range of from 0 to 0.1 (comonomer:ethylene); and from 0 to 0.05 in another embodiment; and from 0 to 0.04 in another embodiment; and from 0 to 0.03 in another embodiment; and from 0 to 0.02 in another embodiment.

Hydrogen gas may also be added to the polymerization reactor(s) to control the final properties (e.g., $I_{21}$ and/or $I_2$) of the inventive polyethylene composition. In one embodiment, the ratio of hydrogen to total ethylene monomer (ppm $H_2$/mol % $C_2$) in the circulating gas stream is in a range of from 0 to 60:1 in one embodiment; from 0.10:1 (0.10) to 50:1 (50) in another embodiment; from 0 to 35:1 (35) in another embodiment; from 0 to 25:1 (25) in another embodiment; from 7:1 (7) to 22:1 (22).

In one embodiment, the process for producing a linear polyethylene composition comprises the steps of: (1) (co) polymerizing ethylene and optionally one or more α-olefin comonomer in the presence of a hafnium based metallocene catalyst via a gas phase (co)polymerization process in a single stage reactor; and (2) thereby producing the linear polyethylene composition.

The hafnium based catalyst system, as used herein, refers to a catalyst capable of catalyzing the polymerization of ethylene monomers and optionally one or more α-olefin co monomers to produce polyethylene. Furthermore, the hafnium based catalyst system comprises a hafnocene component. The hafnocene component may comprise mono-, bis- or tris-cyclopentadienyl-type complexes of hafnium. In one embodiment, the cyclopentadienyl-type ligand comprises cyclopentadienyl or ligands isolobal to cyclopentadienyl and substituted versions thereof. Representative examples of ligands isolobal to cyclopentadienyl include, but are not limited to, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4Ind$") and substituted versions thereof. In one embodiment, the hafnocene component is an unbridged bis-cyclopentadienyl hafnocene and substituted versions thereof. In another embodiment, the hafnocene component excludes unsubstituted bridged and unbridged bis-cyclopentadienyl hafnocenes, and unsubstituted bridged and unbridged bis-indenyl hafnocenes. The term "unsubstituted," as used herein, means that there are only hydride groups bound to the rings and no other group. Preferably, the hafnocene useful in the present invention can be represented by the formula (where "Hf" is hafnium):

$$Cp_nHfX_p \qquad (1)$$

wherein n is 1 or 2, p is 1, 2 or 3, each Cp is independently a cyclopentadienyl ligand or a ligand isolobal to cyclopentadienyl or a substituted version thereof bound to the hafnium; and X is selected from the group consisting of hydride, halides, $C_1$ to $C_{10}$ alkyls and $C_2$ to $C_{12}$ alkenyls; and wherein when n is 2, each Cp may be bound to one another through a bridging group A selected from the group consisting of $C_1$ to $C_5$ alkylenes, oxygen, alkylamine, silyl-hydrocarbons, and siloxyl-hydrocarbons. An example of $C_1$ to $C_5$ alkylenes include ethylene (—$CH_2CH_2$—) bridge groups; an example of an alkylamine bridging group includes methylamide (—($CH_3$)N—); an example of a silyl-hydrocarbon bridging group includes dimethylsilyl (—($CH_3$)$_2$Si—); and an example of a siloxyl-hydrocarbon bridging group includes (—O—($CH_3$)$_2$Si—O—). In one particular embodiment, the hafnocene component is represented by formula (1), wherein n is 2 and p is 1 or 2.

As used herein, the term "substituted" means that the referenced group possesses at least one moiety in place of one or more hydrogens in any position, the moieties selected from such groups as halogen radicals such as F, Cl, Br., hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof. More preferably, the hafnocene component useful in the present invention can be represented by the formula:

$$(CpR_5)_2HfX_2 \qquad (2)$$

wherein each Cp is a cyclopentadienyl ligand and each is bound to the hafnium; each R is independently selected from hydrides and $C_1$ to $C_{10}$ alkyls, most preferably hydrides and $C_1$ to $C_5$ alkyls; and X is selected from the group consisting of hydride, halide, $C_1$ to $C_{10}$ alkyls and $C_2$ to $C_{12}$ alkenyls, and more preferably X is selected from the group consisting of halides, $C_2$ to $C_6$ alkylenes and $C_1$ to $C_6$ alkyls, and most preferably X is selected from the group consisting of chloride, fluoride, $C_1$ to $C_5$ alkyls and $C_2$ to $C_6$ alkylenes. In a most preferred embodiment, the hafnocene is represented by formula (2) above, wherein at least one R group is an alkyl as defined above, preferably a $C_1$ to $C_5$ alkyl, and the others are hydrides. In a most preferred embodiment, each Cp is independently substituted with from one two three groups selected from the group consisting of methyl, ethyl, propyl, butyl, and isomers thereof.

In one embodiment, the hafnocene based catalyst system is heterogeneous, i.e. the hafnocene based catalyst may further comprise a support material. The support material can be any material known in the art for supporting catalyst compositions; for example an inorganic oxide; or in the alternative, silica, alumina, silica-alumina, magnesium chloride, graphite, magnesia, titania, zirconia, and montmorillonite, any of which can be chemically/physically modified such as by fluoriding processes, calcining or other processes known in the art. In one embodiment the support material is a silica material having an average particle size as determined by Malvern analysis of from 1 to 60 mm; or in the alternative, 10 to 40 mm.

The hafnocene based catalyst system may further comprise an activator. Any suitable activator known to activate catalyst components towards olefin polymerization may be suitable. In one embodiment, the activator is an alumoxane; in the alternative methalumoxane such as described by J. B. P. Soares and A. E. Hamielec in 3(2) POLYMER REACTION ENGINEERING 131 200 (1995). The alumoxane may preferably be co-supported on the support material in a molar ratio of aluminum to hafnium (Al:Hf) ranging from 80:1 to 200:1, most preferably 90:1 to 140:1.

Such hafnium based catalyst systems are further described in details in the U.S. Pat. No. 6,242,545 and U.S. Pat. No. 7,078,467, incorporated herein by reference.

Low Density Polyethylene Composition Component

The polyethylene blend composition further comprises from 5 to 40 percent by weight of a low density polyethylene composition; for example, from 5 to 30 weight percent; or in the alternative, from 5 to 20 weight percent. Such low density polyethylene compositions are commercially available from The Dow Chemical Company.

A low density polyethylene composition suitable for the present invention has a density in the range of from 0.915 to 0.930 g/cm$^3$; for samples, from 0.917 to 0.930 g/cm$^3$. Additionally, the low density polyethylene composition suitable for the present invention has a melt index ($I_2$) of in the range of from 0.4 to 10 g/10 minutes; for example, from 0.4 to 5 g/10 minutes.

Polyethylene Blend Composition

The polyethylene blend composition according to the present invention has a density in the range of from 0.917 to 0.960 g/cm$^3$; for example, from 0.917 to 0.920 g/cm$^3$; or in the alternative, from 0.940 to 0.960 g/cm$^3$. The polyethylene blend composition according to the present invention has a melt index ($I_2$) in the range of from 2 to 30 g/10 minutes; or in the alternative, from 5 to 20 g/10 minutes; or in the alternative, from 5 to 15 g/10 minutes.

The polyethylene blend composition according to the present invention provides reduced chill roll build ups during extrusion process; thereby, improving article manufacturing processability. For example, the polyethylene blend composition of the present invention produces less than 0.07 grams of contamination, measured according to the Plate Out Test, described hereinbelow; for example, the polyethylene blend composition of the present invention produces less than 0.06 grams of contamination, measured according to the Plate Out Test; or the in alternative, the polyethylene blend composition of the present invention produces less than 0.05 grams of contamination, measured according to the Plate Out Test; or in the alternative, the polyethylene blend composition of the present invention produces less than 0.01 grams of contamination, measured according to the Plate Out Test.

End-Use Applications

The polyethylene blend composition according to the present invention is suitable for extrusion coating process, extrusion lamination process, and cast film extrusion process.

In the extrusion coating process, the polyethylene blend composition according to the present invention is melted via, for example an extruder, and the molten polyethylene blend composition is applied to a moving substrate such as paper, paperboard, foil, or other polymeric films; thereby, producing a coated substrate or article.

In the extrusion lamination process, the polyethylene blend composition according to the present invention is melted via, for example an extruder, and the molten polyethylene blend composition is applied to at least 2 moving substrates to be glued together with the molten polyethylene blend composition.

In both extrusion coating and extrusion lamination processes, the traveling web(s) is (are) being pressed between a pressure loaded roll and a chill roll for quick quenching of the molten polyethylene blend composition. It is the job of the extrusion coating line to apply this molten film as a gel free uniform layer to yield a wrinkle-free substrate. Chill roll build-up for extrusion lamination is typically an issue if the molten polymer web is wider than the substrates (known as overcoating), thus having the potential for contamination at the edges.

In the cast film extrusion process, a thin film is extruded through a slit onto a chilled, highly polished turning roll, where it is quenched from one side. The speed of the roller controls the draw ratio and final film thickness. The film is then sent to a second roller for cooling on the other side. Finally it passes through a system of rollers and is wound onto a roll.

EXAMPLES

The following examples illustrate the present invention but are not intended to limit the scope of the invention. The examples of the instant invention demonstrate that the inventive polyethylene blend compositions possess improved chill roll buildups during extrusion process.

Inventive Examples

Catalyst Component Preparation

The hafnocene component can be prepared by techniques known in the art. For example, HfCl$_4$ (1.00 equiv.) can be added to ether at −30° C. to −50° C. and stirred to give a white suspension. The suspension can then be re-cooled to −30° C. to −50° C., and then lithium propylcyclopentadienide (2.00 equiv.) added in portions. The reaction will turn light brown and become thick with suspended solid on adding the lithium propylcyclopentadienide. The reaction can then be allowed to warm slowly to room temperature and stirred 10 to 20 hours.

The resultant brown mixture can then be filtered to give brown solid and a straw yellow solution. The solid can then be washed with ether as is known in the art, and the combined ether solutions concentrated to under vacuum to give a cold, white suspension. Off-white solid product is then isolated by filtration and dried under vacuum, with yields of from 70 to 95%.

Catalyst Composition Preparation

The catalyst compositions should be made at a Al/Hf mole ratio of from about 80:1 to 130:1 and the hafnium loading on the finished catalyst should be from about 0.6 to 0.8 wt % Hf using the following general procedure. Methylaluminoxane (MAO) in toluene should be added to a clean, dry vessel and stirred at from 50 to 80 rpm and at a temperature in the range of 60 to 100° F. Additional toluene can then be added while stirring. The hafnocene can then be dissolved in an amount of toluene and placed in the vessel with the MAO. The metallocene/MAO mixture can then be stirred at for from 30 min to 2 hours. Next, an appropriate amount of silica (average particle size of from 22 to 28 μm, dehydrated at 600° C.) can be added and stirred for another hour or more. The liquid can then be decanted and the catalyst composition dried at elevated temperature under flowing nitrogen while being stirred.

Polymerization Process for Preparing the Linear Polyethylene Composition Component for the Inventive Polyethylene Blend Composition 1

The linear polyethylene composition component A, an ethylene/1-hexene copolymer, was produced in accordance with the following general procedure. The catalyst composition comprised a silica supported bis(n-propylcyclopentadienyl) hafnium dichloride with methalumoxane, the Al:Hf ratio being from about 80:1 to 130:1. The catalyst composition was injected dry into a fluidized bed gas phase polymerization reactor. More particularly, polymerization was conducted in a 336.5-419.3 mm ID diameter gas-phase fluidized bed reactor operating at approximately 2068 to 2586 kPa total pressure. The reactor bed weight was approximately 41-91 kg. Fluidizing gas was passed through the bed at a velocity of approximately 0.49 to 0.762 m per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reaction temperature to the specified value. Ethylene, hydrogen, 1-hexene and nitrogen were fed to the cycle gas loop just upstream of the compressor at quantities sufficient to maintain the desired gas concentrations. Gas concentrations were measured by an on-line vapor fraction analyzer. Product (the inventive polyethylene particles) was withdrawn from the reactor in batch mode into a purging vessel before it was transferred into a product bin. Residual catalyst and activator in the resin was deactivated in the product drum with a wet nitrogen purge. The catalyst was fed to the reactor bed through a stainless steel injection tube at a rate sufficient to maintain the desired polymer production rate. The polymerization process was conducted according to the process conditions reported in Table I. Tables II-III summarize the properties of the linear polyethylene composition A. The CEF results for linear polyethylene composition A are reported in Table IV, and shown in FIG. 1.

Polymerization Process for Preparing the Linear Polyethylene Composition Components for the Comparative Polyethylene Blend Compositions 1 and 2

Figure 2:
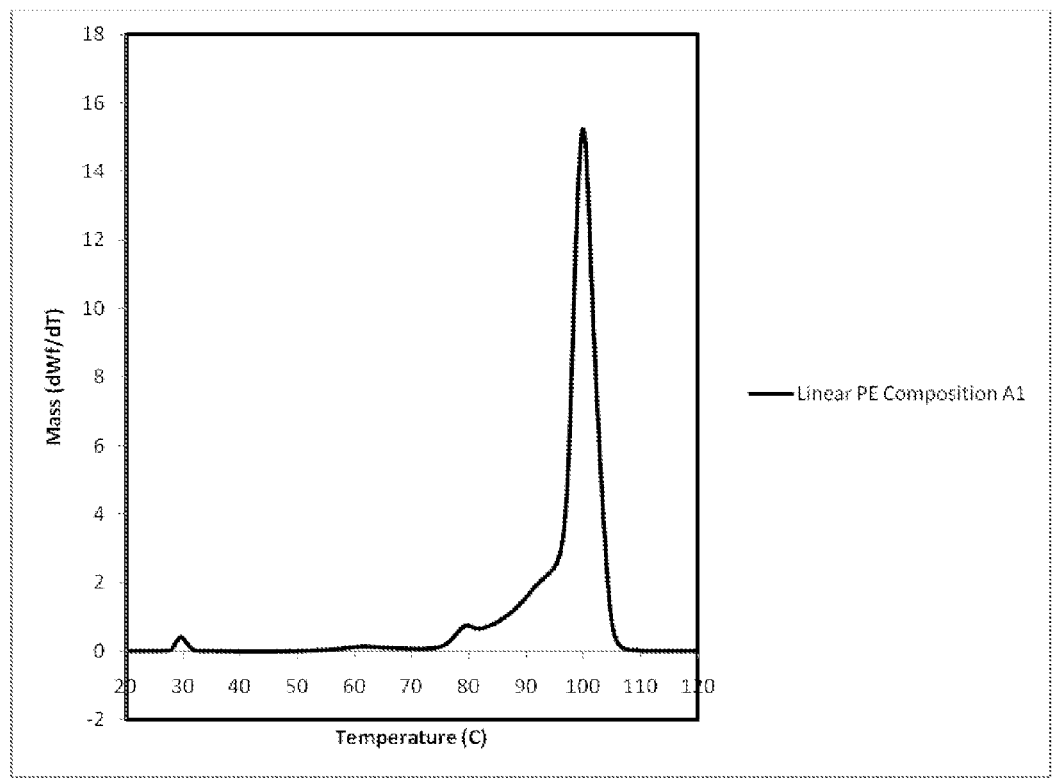
FIG. 2 is a graph illustrating the relationship between Mass (dWf/dt) and Temperature (° C.) of the linear polyethylene composition A1, as determined by CEF.
Figure 3:
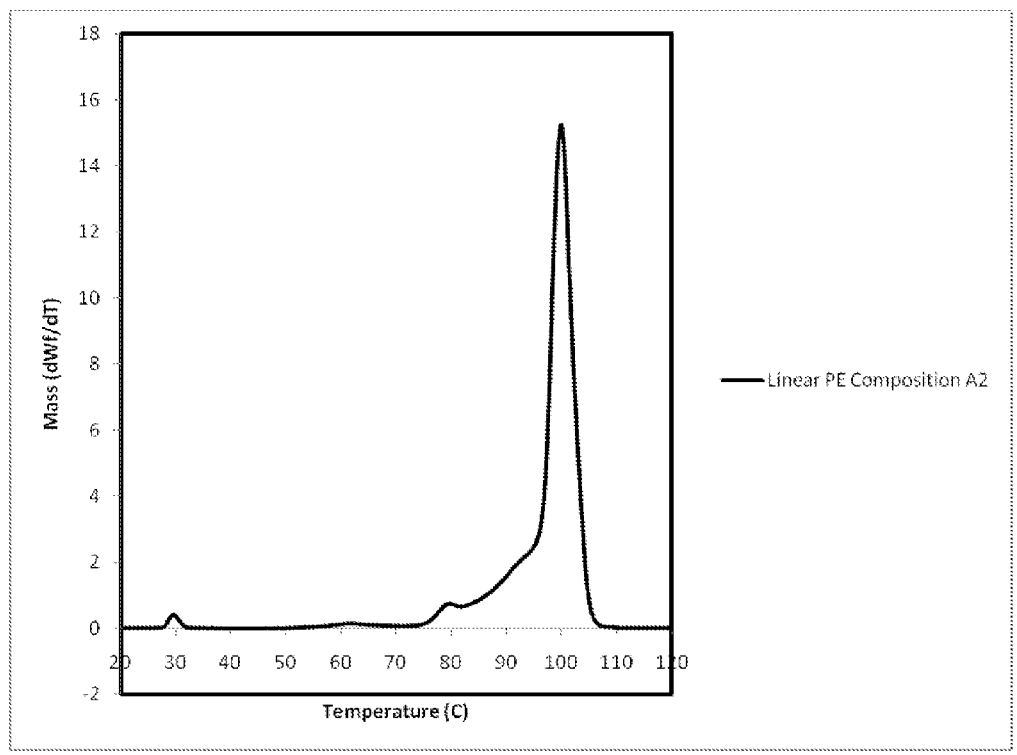
FIG. 3 is a graph illustrating the relationship between Mass (dWf/dt) and Temperature (° C.) of the linear polyethylene composition A2, as determined by CEF.

The linear polyethylene composition component A1 and A2, ethylene/1-hexene copolymers, where prepared via a Ziegler Natta catalyst system according to the process generally described above for the production of the linear polyethylene composition component A, based on the process conditions reported in Table I. Table II-III summarize the properties of the linear polyethylene compositions A1 and A2. The CEF results for linear polyethylene compositions A1 and A2 are reported in Table IV, and shown in FIGS. 2 and 3, respectively.

Inventive Polyethylene Blend Composition 1

Inventive polyethylene blend composition 1 comprises 85 percent by weight of the linear polyethylene composition component A, as described above, based on the total weight of the inventive polyethylene blend composition 1, and 15 percent by weight of a low density polyethylene composition B, based on the total weight of the inventive polyethylene blend composition 1. The properties of the linear polyethylene composition component A, and the low density polyethylene composition B are reported in Table II. Properties of inventive polyethylene blend composition 1 are reported in Table III.

Comparative Polyethylene Blend Compositions 1 and 2

Comparative polyethylene blend composition 1 comprises 85 percent by weight of the linear polyethylene composition component A1, as described above, based on the total weight of the comparative polyethylene blend composition 1, and 15 percent by weight of a low density polyethylene composition B1, based on the total weight of the comparative polyethylene blend composition 1. The properties of the linear polyethylene composition component A1, and the low density polyethylene composition B1 are reported in Table II. Properties of comparative polyethylene blend composition 1 are reported in Table III.

Comparative polyethylene blend composition 2 comprises 70 percent by weight of the linear polyethylene composition component A2, as described above, based on the total weight of the comparative polyethylene blend composition 2, and 30 percent by weight of a low density polyethylene composition B2, based on the total weight of the comparative polyethylene blend composition 2. The properties of the linear polyethylene composition component A2, and the low density polyethylene composition B2 are reported in Table II. Properties of comparative polyethylene blend composition 2 are reported in Table III.

Film Production Process

Inventive film 1 and comparative films 1-2 were prepared according to the following procedure.
Inventive film 1 comprises the inventive polyethylene blend composition 1;
Comparative film 1 comprises the comparative polyethylene blend composition 1; and
Comparative film 2 comprises the comparative polyethylene blend composition 2.
Inventive film 1, and comparative films 1-2 were fabricated on a 5 layer Egan Davis Standard coextrusion cast film line.

The cast line consists of three 2½" and two 2" 30:1 L/D Egan Davis Standard MAC extruders which are air cooled. All extruders have moderate work DSB (Davis Standard Barrier) type screws. A CMR 2000 microprocessor monitors and controls operations. The extrusion process is monitored by pressure transducers located before and after the breaker plate as well as four heater zones on each barrel, one each at the adapter and the block and two zones on the die. The microprocessor also tracks the extruder RPM, % FLA, HP, rate, line speed, % draw, primary and secondary chill roll temperatures, gauge deviation, layer ratio, rate/RPM, and melt temperature for each extruder.

Equipment specifications include a Cloeren 5 layer dual plane feed block and a Cloeren 36" Epich II autogage 5.1 die. The primary chill roll has a matte finish and is 40" O.D.×40" long with a 30-40 RMS surface finish for improved release characteristics. The secondary chill roll is 20" O.D.×40" long with a 2-4 RMS surface for improved web tracking. Both the primary and secondary chill roll has chilled water circulating through it to provide quenching. There is an NDC Beta gauge sensor for gauge thickness and automatic gauge control if needed. Rate is measured by five Barron weigh hoppers with load cells on each hopper for gravimetric control. Samples are finished on the two position single turret Horizon winder on 3" I.D. cores with center wind automatic roll changeover and slitter station. The maximum throughput rate for the line is 600 pounds per hour and maximum line speed is 900 feet per minute.

Inventive film 1, and comparative films 1-2 were fabricated based on the following conditions:
Melt Temperature=550° F.
Temperature Profile (B1 300° F., B2 475° F., B3-5 550° F., Screen 550° F., Adaptor 550° F., Die all zones 550° F.)
Line speed=300 ft/min
Through put rate=550-600 lb/hr
Chill roll temperature=90° F.
Cast roll temperature=70° F.
Air knife=6" H2O
Vacuum box=OFF
Die gap=20-25 mil These conditions were chosen to produce maximum amount of sheer stress when processing in order to produce elevated amounts of chill roll plate out.

The plate out for each film production was determined according to the plate out testing process described below, and the results are reported in Table V.

Test Methods

Test methods include the following:
Density (g/cm$^3$) was measured according to ASTM-D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch."

Melt index ($I_2$) was measured at 190° C. under a load of 2.16 kg according to ASTM D-1238-03.

Melt index ($I_{10}$) was measured at 190° C. under a load of 10.0 kg according to ASTM D-1238-03.

Weight average molecular weight ($M_w$) and number average molecular weight ($M_n$) were determined according to methods known in the art using triple detector GPC, as described herein below.

The molecular weight distributions of the ethylene polymers were determined by gel permeation chromatography (GPC). The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were four Shodex HT 806M 300 mm, 13 μm columns and one Shodex HT803M 150 mm, 12 μm column. The solvent used was 1,2,4 trichlorobenzene. The samples were prepared at a concentration of 0.1 grams of polymer in 50 milliliters of solvent. The chromatographic solvent and the sample preparation solvent contained 200 μg/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min. Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component, to minimize degradation. The polystyrene standard peak molecular weights were converted to polyethylene molecular weights using the following equation (as described in Williams and Ward, *J. Polym. Sci., Polym. Let.*, 6, 621 (1968)):

$$M \text{polyethylene} = A \times (M \text{polystyrene})^B,$$

where M is the molecular weight, A has a value of 0.41 and B is equal to 1.0. The Systematic Approach for the determination of multi-detector offsets was done in a manner consistent with that published by Balke, Mourey, et al. (Mourey and Balke, *Chromatography Polym*. Chpt 12, (1992) and Balke, Thitiratsakul, Lew, Cheung, Mourey, *Chromatography Polym*. Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing 2$^{nd}$ Virial coefficient effects (concentration effects on molecular weight). Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (2) below:

(2)

$$\overline{Mn} = \frac{\sum_i Wf_i}{\sum_i (Wf_i / M_i)} \quad \text{a)}$$

$$\overline{Mw} = \frac{\sum_i (Wf_i * M_i)}{\sum_i Wf_i} \quad \text{b)}$$

$$\overline{Mz} = \frac{\sum_i (Wf_i * M_i^2)}{\sum_i (Wf_i * M_i)} \quad \text{c)}$$

Vinyl unsaturations were measured according to ASTM D-6248-98.

Trans unsaturations were measured according to ASTM D-6248-98.

Methyl groups were determined according to ASTM D-2238-92.

Vinylidene groups were determined according to ASTM D-3124-98.

Plate Out Testing

Plate out testing was conducted according to the following procedure:

(A) Sampling:

To collect a sample of plate out from the chill roll a rubber sanding block with a piece of black cotton cloth was used. First the chill roll was cleaned extensively using glass cleaner as well as the plate out roll. The plate out roll is made of rubber that when engaged can remove plate out deposits from the chill roll. The plate out roll for this experiment is engaged only to clean the chill roll. After the chill roll is clean the plate out roll is disengaged. It is common practice in industry however, to run with the plate out roll engaged to reduce plate out build up and lengthen run time. After the chill roll has been cleaned and process conditions are lined sampling was utilized after 3 hours of running. A 100% cotton cloth of approximately 12 inches by 12 inches is mounted onto the surface of a sanding block which measures approximately 4 inches by 10 inches. The mounted cloth is then firmly pressed against the rotating chill roll with the 10 inch length in the horizontal position and moved constantly from side to side along the 40 inch width of the chill roll where the molten web has caused contamination on the roll. The 40 inch diameter chill roll constantly rotates during the 1 minute collection period while the film travels at 300 feet per minute. The cloth is weighed before and after the test resulting in produced contamination data; and (B) Testing To quantify the amount of plate out observed during processing the cloth used for sample extraction was weighed on a Mettler AE-200 four place balance both before and after sampling.

CEF Method

Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600 ppm anti-oxidant butylated hydroxytoluene (BHT) is used as solvent. Sample preparation is done with autosampler at 160° C. for 2 hours under shaking at 4 mg/ml (unless otherwise specified). The injection volume is 300 µl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second. CEF column is packed by the Dow Chemical Company with glass beads at 125 µm±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in the following equation:

$$\text{Resolution} = \frac{\text{Peak temperature of NIST 1475a} - \text{Peak Temperature of Hexacontane}}{\text{Half-height Width of NIST 1475a} + \text{Half-height Width of Hexacontane}},$$

where the column resolution is 6.0.

TABLE I

| Measurement | Units | Linear PE Composition A | Linear PE Composition A1 | Linear PE Composition A2 |
|---|---|---|---|---|
| Reactor Temperature | ° C. | 85 | 95 | 95 |
| Isopentane % | mol % | 10 | 9 | 9 |
| Ethylene Partial Pressure | psia | 190 | 115 | 115 |
| C6/C2 molar ratio | unitless | 0.0017 | 0.021 | 0.021 |
| Hydrogen Vapor Concentration | ppm | 374 | 241500 | 241500 |

TABLE I-continued

| Measurement | Units | Linear PE Composition A | Linear PE Composition A1 | Linear PE Composition A2 |
|---|---|---|---|---|
| Continuity Additive amount in resin | ppm(w) | 8.5 | 0 | 0 |
| Hf amount in resin | ppm(w) | 0.9 | 0 | 0 |
| Al amount in resin | ppm(w) | 16 | 125 | 125 |
| Ti amount in resin | ppm(w) | 0 | 3.5 | 3.5 |

TABLE II

| Measurement | Units | Linear PE Composition A | LDPE B | Linear PE Composition A1 | LDPE B1 | Linear PE Composition A2 | LDPE B2 |
|---|---|---|---|---|---|---|---|
| Density | g/cm$^3$ | 0.955 | 0.918 | 0.955 | 0.918 | 0.955 | 0.918 |
| $I_2$ | g/10 min | 25 | 0.47 | 22 | 0.47 | 22 | 2.3 |
| Conventional GPC | | | | | | | |
| Mn | g/mol | 14,723 | 21,360 | 11,903 | 21,360 | 11,903 | 14,520 |
| Mw | g/mol | 47,667 | 243,310 | 54,776 | 243,310 | 54,776 | 168,740 |
| Mz | g/mol | 103,947 | 854,500 | 180,512 | 854,500 | 180,512 | 647,300 |
| Mw/Mn | unitless | 4.60 | 11.39 | 4.6 | 11.39 | 4.6 | 11.62 |
| Absolute GPC | | | | | | | |
| Mn absolute | g/mol | 13,842 | 25,319 | 11,995 | 25,319 | 11,995 | 15,964 |
| Mw absolute | g/mol | 43,859 | 908,600 | 53,341 | 908,600 | 53,341 | 489,110 |
| Mz (absolute) | g/mol | 93,063 | 4,669,500 | 177,921 | 4,669,500 | 177,921 | 3,189,900 |
| Mz (abs./Mw(abs) | unitless | 2.12 | 5.14 | 3.34 | 5.14 | 3.34 | 6.52 |
| Unsaturations | | | | | | | |
| methyls | per 1000 C's | 2.22 | | 3.13 | | 3.13 | |
| trans | per 1000 C's | 0.0355 | | 0 | | 0 | |
| vinyls | per 1000 C's | 0.0021 | | 0.0755 | | 0.0755 | |
| vinylidene | Per 1000 C's | 0.00292 | | 0.00391 | | 0.00391 | |

TABLE III

| Measurement | Units | Inventive PE Blend Composition 1 | Comparative PE Blend Composition 1 | Comparative PE Blend Composition 2 |
|---|---|---|---|---|
| Density | g/cm$^3$ | 0.949 | 0.949 | 0.945 |
| $I_2$ | g/10 min | 14.6 | 11.8 | 11.04 |
| $I_{10}/I_2$ | g/10 min | 6.7 | 7.0 | |
| Conventional GPC | | | | |
| Mn | g/mol | 16,841 | 11,710 | 12,220 |
| Mw | g/mol | 76,805 | 82,730 | 92,930 |
| Mz | g/mol | 394,120 | 460,600 | 484,400 |
| Mw/Mn | unitless | 4.6 | 7.1 | 7.6 |
| Mz/Mw | unitless | 5.1 | 5.6 | 5.2 |
| Absolute GPC | | | | |
| Mn absolute | g/mol | 18,051 | 12,679 | 12,989 |
| Mw absolute | g/mol | 180,340 | 194,470 | 232,450 |
| Mz(absolute) | g/mol | 3,036,303 | 3,5400,000 | 3,060,600 |
| Mz(abs./Mw(abs) | unitless | 16.8 | 18.2 | 13.17 |
| Unsaturations | | | | |
| methyls | per 1000 C's | 5.39 | 5.39 | 8.00 |
| trans | per 1000 C's | 0.0378 | 0 | 0.004 |
| vinyls | per 1000 C's | 0.0055 | 0.0727 | 0.0517 |
| Vinylidene | Per 1000 C's | 0.0446 | 0.0336 | 0.0665 |

TABLE IV

| | Temp Range of Each Zone (° C.) | | | Peak Temp of Each Zone (° C.) | | | Wt % of Each zone | | |
|---|---|---|---|---|---|---|---|---|---|
| | Zone 1 | Zone 2 | Zone 3 | Zone 1 | Zone 2 | Zone 3 | Zone 1 | Zone 2 | Zone 3 |
| Linear PE A | 27.31 to 31.97 | 32.02 to 91.98 | 92.02 to 107.98 | 29.57 | 91.98 | 98.90 | 0.01 | 0.07 | 0.92 |
| Linear PE A1 | 27.31 to 31.99 | 32.04 to 91.99 | 92.02 to 107.98 | 29.52 | 91.99 | 99.92 | 0.01 | 0.17 | 0.82 |

TABLE IV-continued

| | Temp Range of Each Zone (° C.) | | | Peak Temp of Each Zone (° C.) | | | Wt % of Each zone | | |
|---|---|---|---|---|---|---|---|---|---|
| | Zone 1 | Zone 2 | Zone 3 | Zone 1 | Zone 2 | Zone 3 | Zone 1 | Zone 2 | Zone 3 |
| Linear PE A2 | 27.31 to 31.99 | 32.04 to 91.99 | 92.02 to 107.98 | 29.52 | 91.99 | 99.92 | 0.01 | 0.17 | 0.82 |

TABLE V

| | Plate out (g) |
|---|---|
| Inventive Film 1 | 0.0070 |
| Comparative Film 1 | 0.1673 |
| Comparative Film 2 | 0.0963 |

We claim:

1. A polyethylene blend composition having reduced chill roll buildup during extrusion process comprising:
   (a) from 60 to 95 percent by weight of a linear polyethylene composition comprising; less than or equal to 100 percent by weight of the units derived from ethylene; less than 15 percent by weight of units derived from one or more α-olefin comonomers; wherein said linear polyethylene composition has a density in the range of from 0.917 to 0.975 g/cm$^3$, a molecular weight distribution (Mw/Mn) in the range of from 1.70 to 3.62, a melt index ($I_2$) in the range of from 2 to 50 g/10 minutes, and vinyl unsaturation in the range of from less than 0.06 vinyls per one thousand carbon atoms present in the linear polyethylene composition wherein said linear polyethylene composition is a linear low density polyethylene (LLDPE), a high density polyethylene (HDPE), or combinations thereof;
   (b) from 5 to 40 percent by weight of a low density polyethylene composition (LDPE) having a density in the range of from 0.915 to 0.930 g/cm$^3$, and a melt index ($I_2$) in the range of from 0.4 to 10 g/10 minutes;
   wherein the polyethylene blend composition has a density in the range of 0.917 to 0.920 g/cm$^3$ and a melt index ($I_2$) in the range of from 2 to 30 g/10 minutes and wherein said polyethylene blend composition produces less than 0.06 grams of contamination, measured according to a Plate Out Test.

2. The polyethylene blend composition according to claim 1, wherein said linear polyethylene composition has a density in the range of from 0.940 to 0.960 g/cm$^3$ or a melt index ($I_2$) in the range of from 15 to 40 g/10 minutes.

3. The polyethylene blend composition according to claim 1, wherein said LDPE has a density in the range of from 0.917 to 0.930 g/cm$^3$ or a melt index ($I_2$) in the range of from 0.4 to 5 g/10 minutes.

4. The polyethylene blend composition according to claim 1, wherein said linear polyethylene composition has less than 2 peaks on an elution temperature-eluted amount curve determined by Crystallization Elution Fractionation (CEF) method at equal or above 30° C., wherein the purge peak which is below 30° C. is excluded.

5. The polyethylene blend composition according to claim 1, wherein said linear polyethylene composition is substantially free of long chain branching.

6. The polyethylene blend composition according to claim 1, wherein said linear polyethylene composition comprises less than 100 parts by weight of a hafnium based metallocene catalyst per one million parts of the linear polyethylene composition.

7. The polyethylene blend composition of claim 1, wherein said linear polyethylene blend composition is the (co)polymerization reaction product of ethylene and optionally one or more α-olefin comonomers in the presence of a hafnium based metallocene catalyst via a gas phase (co)polymerization process in a single stage reactor.

8. An article comprising:
   one or more substrates;
   one or more coating layers or laminated layers associated with one or more surfaces of said one or more substrates, wherein said one or more coating layers or laminate layers comprise the polyethylene blend composition of claim 1.

9. The article of claim 8, wherein said article is obtained via extrusion coating process or extrusion lamination process.

* * * * *